US008764562B2

(12) United States Patent
Visser

(10) Patent No.: US 8,764,562 B2
(45) Date of Patent: Jul. 1, 2014

(54) METHOD OF PROVIDING A PLAYER INTERFACE IN A GAMING SYSTEM

(75) Inventor: Antoon Christiaan Visser, Coogee (AU)

(73) Assignee: Aristocrat Technologies Australia Pty Limited (AU)

( * ) Notice: Subject to any disclaimer, the term of this patent is extended or adjusted under 35 U.S.C. 154(b) by 1328 days.

(21) Appl. No.: 12/138,272

(22) Filed: Jun. 12, 2008

(65) Prior Publication Data

US 2009/0093295 A1 Apr. 9, 2009

(30) Foreign Application Priority Data

Jun. 14, 2007 (AU) ................................ 2007903200

(51) Int. Cl.

*A63F 13/525* (2014.01)
*A63F 13/45* (2014.01)
*G07F 17/32* (2006.01)

(52) U.S. Cl.

CPC ........ *G07F 17/3262* (2013.01); *G07F 17/3267* (2013.01)
USPC .................... 463/33; 463/16; 463/31; 463/32

(58) Field of Classification Search

CPC .............. G07F 17/326; G07F 17/3262; G07F 17/3265; G07F 17/3267; G07F 17/3269
USPC .................................... 463/16–22, 25, 30–34
See application file for complete search history.

(56) References Cited

U.S. PATENT DOCUMENTS 5,413,342 A 5/1995 Kaplan
5,641,166 A * 6/1997 Reisel .......................... 273/261
5,724,492 A 3/1998 Matthews, III et al.
5,951,010 A 9/1999 Ordinas
6,070,350 A 6/2000 Fantone et al.
6,184,884 B1 2/2001 Nagahara et al.
6,296,568 B1 10/2001 Tracy
6,409,602 B1 * 6/2002 Wiltshire et al. ............... 463/42
6,597,358 B2 * 7/2003 Miller .......................... 345/427
6,634,941 B2 * 10/2003 Olive ............................ 463/16
7,196,710 B1 3/2007 Fouladi et al.
2002/0025846 A1 * 2/2002 Bennett et al. ................. 463/20
2002/0115485 A1 * 8/2002 Muir et al. ..................... 463/20

(Continued)

FOREIGN PATENT DOCUMENTS

BE 1008655 7/1996
CN 1323000 11/2001

(Continued)

OTHER PUBLICATIONS

Chessmaster 9000 (2002) [game manual] Ubi Soft Entertainment.*

(Continued)

*Primary Examiner* — Bach Hoang

(74) *Attorney, Agent, or Firm* — McAndrews, Held & Malloy, Ltd.

(57) ABSTRACT

A method of providing a player interface for a gaming system comprising: displaying an object to a player comprising at least two faces, each face of the object associated with a game playable with the gaming system and having an image thereon corresponding to the game, the object being displayed such that at least one face is visible; providing to the player at least one view manipulation function to allow the player to manipulate viewing of the object to view each face of the object.

12 Claims, 11 Drawing Sheets

(56) References Cited

U.S. PATENT DOCUMENTS

| | | | | |
|---|---|---|---|---|
| 2003/0166410 | A1 * | 9/2003 | Olive | 463/13 |
| 2004/0053686 | A1 | 3/2004 | Pacey et al. | |
| 2004/0077401 | A1 * | 4/2004 | Schlottmann | 463/20 |
| 2004/0077402 | A1 * | 4/2004 | Schlottmann | 463/20 |
| 2005/0012720 | A1 | 1/2005 | Pryor | |
| 2005/0049026 | A1 | 3/2005 | Angel | |
| 2006/0058100 | A1 * | 3/2006 | Pacey et al. | 463/31 |
| 2006/0105666 | A1 | 5/2006 | Oech | |
| 2007/0035831 | A1 | 2/2007 | Novelo | |
| 2007/0083499 | A1 | 4/2007 | Lee et al. | |

FOREIGN PATENT DOCUMENTS

| | | | |
|---|---|---|---|
| CN | 1648818 | | 8/2005 |
| EP | 1463007 | | 9/2004 |
| GB | 113330 | | 2/1918 |
| GB | 334308 | | 9/1930 |
| GB | 353940 | | 7/1931 |
| GB | 900079 | | 7/1962 |
| GB | 1277774 | | 6/1972 |
| GB | 2412818 | A | 10/2005 |
| GB | 2425445 | | 10/2006 |
| JP | 11253621 | | 9/1999 |
| JP | 2001239018 | | 9/2001 |
| JP | 2001259172 | | 9/2001 |
| JP | 2003228728 | | 8/2003 |
| JP | 2003228737 | | 8/2003 |
| JP | 2003233838 | | 8/2003 |
| JP | 2005270165 | | 10/2005 |
| JP | 2006099233 | | 4/2006 |
| JP | 2006223388 | | 8/2006 |
| JP | 2006314609 | | 11/2006 |
| JP | 2006334177 | | 12/2006 |
| JP | 2006334178 | | 12/2006 |
| JP | 2006340771 | | 12/2006 |
| KR | 20020015974 | | 3/2002 |
| KR | 100347837 | B | 7/2002 |
| NZ | 501229 | | 11/2001 |
| TW | 558669 | B | 10/2003 |
| WO | 2006039324 | | 4/2006 |
| WO | 2007008103 | | 1/2007 |
| WO | 2007032878 | | 3/2007 |
| WO | 2007046622 | | 4/2007 |
| ZA | 200402344 | | 9/2005 |

OTHER PUBLICATIONS (First party developed), Super Mario 64 (1996) [game manual], NUS-NSME-USA, Nintendo of America.*

RARE, Donkey Kong Country (1994) [game manual], SNS-8X-USA, Nintendo Co.*

* cited by examiner

METHOD OF PROVIDING A PLAYER INTERFACE IN A GAMING SYSTEM

RELATED APPLICATIONS

This application claims priority to Australian Provisional Patent Application No. 2007903200, having a filing date of Jun. 14, 2007, entitled "A Method of Providing A Player Interface In A Gaming System," which is hereby incorporated by reference herein in its entirety.

FIELD OF THE INVENTION

The present invention relates to a method of providing a player interface in a gaming system, a method of providing a display of game play in a gaming system, a player interface for a gaming system and a gaming system.

BACKGROUND OF THE INVENTION

Traditionally electronic gaming machines such as slot machines have been programmed to offer a single game to players. More recently, with reduction in the cost of the memory and general computing advances, it has been practical to offer gaming machines where a player can choose from a plurality of different games.

Similarly there is a move towards downloadable gaming, where a player can select a game to be downloading to a gaming machine from one of a plurality of games available via a gaming server. Both of these developments indicate that there is a requirement for a new player interface and display techniques.

BRIEF SUMMARY OF THE INVENTION

In a first aspect, the invention provides a method of providing a player interface for a gaming system comprising:

- displaying an object to a player comprising at least two faces, each face of the object associated with a game playable with the gaming system and having an image thereon corresponding to the game, the object being displayed such that at least one face is visible;
- providing to the player at least one view manipulation function to allow the player to manipulate viewing of the object to view each face of the object.

In an embodiment, the method comprises defining the object, associating each face of the object with a game and providing image data for each face.

In an embodiment, the object has two faces.

In an embodiment, the object has three faces.

In an embodiment, the object has four faces.

In an embodiment, the manipulation function is a rotation function.

In an embodiment, the method comprises controlling the display in response to a manipulation instruction to alter the point of view of the display relative to the object.

In an embodiment, the method comprises altering the perspective of display of the face of the object that corresponds to the selected game prior to commencing the game in response to receipt of a game selection instruction from a player.

In an embodiment, the method comprises adding game play data to the display in response to receipt of a game selection instruction from a player.

In a second aspect, the invention provides a method of providing a display of game play in a gaming system comprising:

- displaying an object comprising at least two levels, a first level associated with a first phase of a game and being associated with an image corresponding to the first phase of the game and a second level associated with a second phase of the game and being associated with an image corresponding to the second phase of the game the object being displayed to a player such that at least the first level is initially visible to the player;
- determining that the player is to proceed to the second phase of the game; and
- controlling the display to display a movement from the first level to the second level of the object corresponding to the second phase of the game.

In an embodiment, the method comprises defining an object comprising at least two levels and associating a first and second phase with a first and second level respectively.

In an embodiment, the method comprises displaying the first and second levels to the player prior to the player commencing the game.

In an embodiment, the second level is above the first level.

In an embodiment, the second level is below the first level.

In an embodiment, the first phase of the game is a base game and the second phase is a feature game.

Persons skilled in the art will appreciate that the first and second aspects of the invention can be combined by defining an object that has at least two faces and at least two levels. In this manner, for example, a player can be provided with a view of each base game and its associated feature game prior to making a game selection.

In a third aspect, the invention provides a player interface for a gaming system comprising:

- a display for displaying an object comprising at least two faces to a player such that at least one face is visible, each face of the object associated with a game and having an image thereon corresponding to the game; and
- a view controller operable by the player to view each face of the object.

In an embodiment, the view controller is operable to rotate the object.

In an embodiment, the view controller is operable to alter the point of view of the display relative to the object.

wherein the view controller is arranged to alter the perspective of display of the face of the object that corresponds to the selected game prior to commencing the game in response to receipt of a game selection instruction.

In a fourth aspect, the invention provides a gaming system comprising:

- a display for displaying an object comprising at least two faces to a player such that at least one face is visible, each face of the object associated with a game and having an image thereon corresponding to the game;
- a view controller operable by the player to view each face of the object; and
- a game controller arranged to implement each of the games.

In an embodiment, the view controller is operable to rotate the object.

In an embodiment, the view controller is operable to alter the point of view of the display relative to the object.

In an embodiment, the view controller alters the perspective of display of the face of the object that corresponds to the selected game prior to commencing the game in response to receipt of a game selection instruction from a player.

In an embodiment, the gaming system is arranged to add game play data to the display in response to receipt of a game selection instruction from a player.

In a fifth aspect, the invention provides a gaming system comprising:

a display; and a game controller arranged to:

control the display to display to a player a first level of an object corresponding to a first phase of a game;

determine that the player is to proceed to a second phase of the game; and control the display to display a movement from the first level to a second level of the object corresponding to the second phase of the game.

In an embodiment, the gaming system comprises a display controller for controlling the display.

In an embodiment, the display controller comprises a view controller adapted to alter the view of the object.

In an embodiment, the view controller has a pan function and a zoom function.

In an embodiment, the game controller is arranged to control the display to display the first and second levels to the player prior to the player commencing the game.

In a sixth aspect, the invention provides computer program code, which when executed implements the method of the first or second aspects.

In a seventh aspect, the invention provides a computer readable medium comprising the above program code.

In an eighth aspect, the invention provides a data signal comprising the program code.

In a ninth aspect, the invention provides transmitting or receiving the program code.

DETAILED DESCRIPTION OF THE INVENTION

Figure 1:
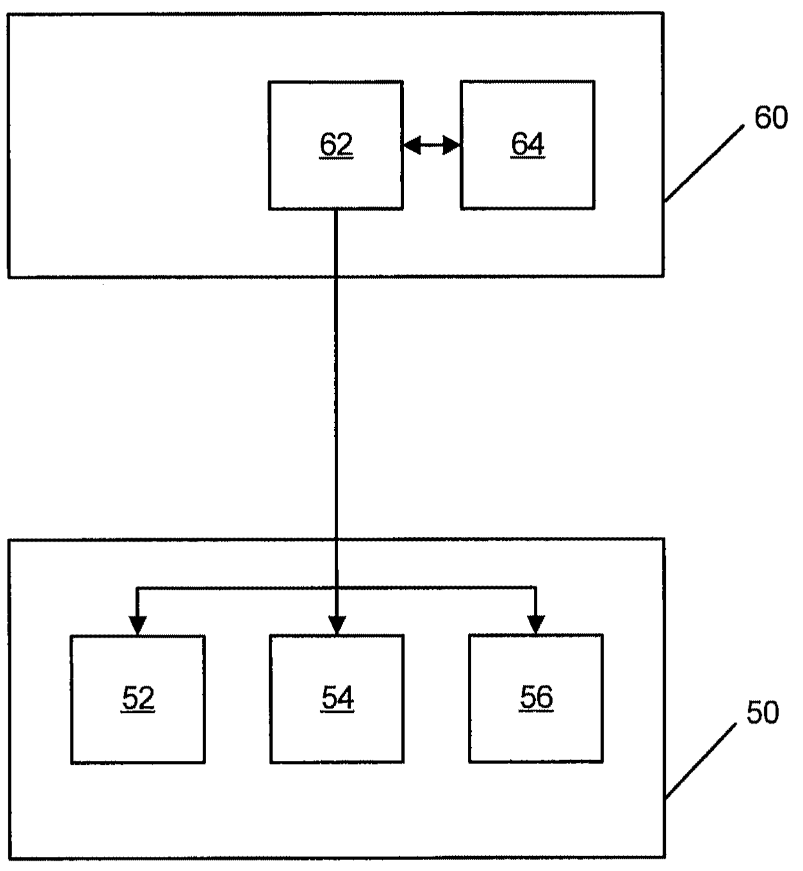
FIG. 1 is a block diagram of the core components of a gaming system.

Referring to the drawings, there is shown a gaming system arranged to implement a game having a player interface adapted to present a plurality of games to a player. The gaming system can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaining server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
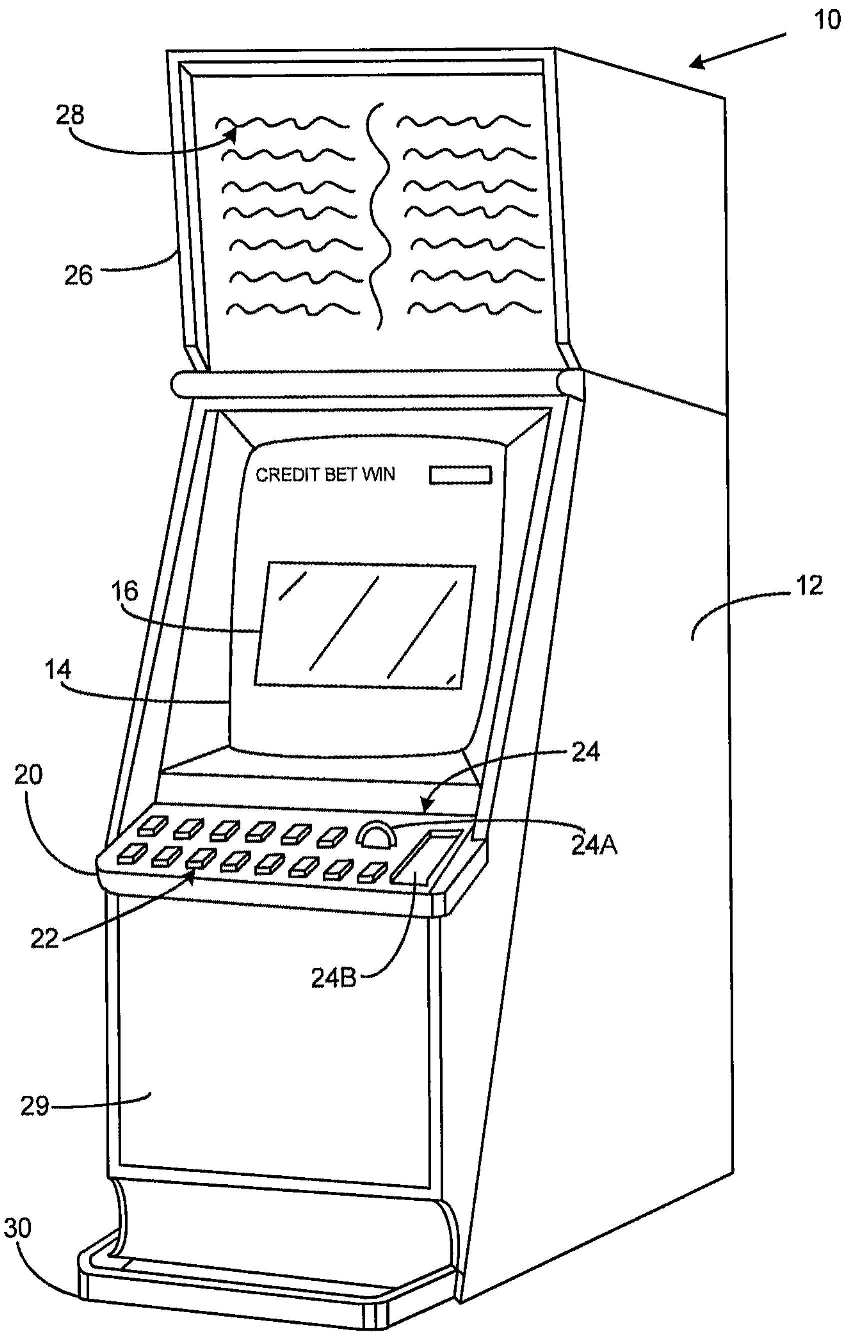
FIG. 2 is a perspective view of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
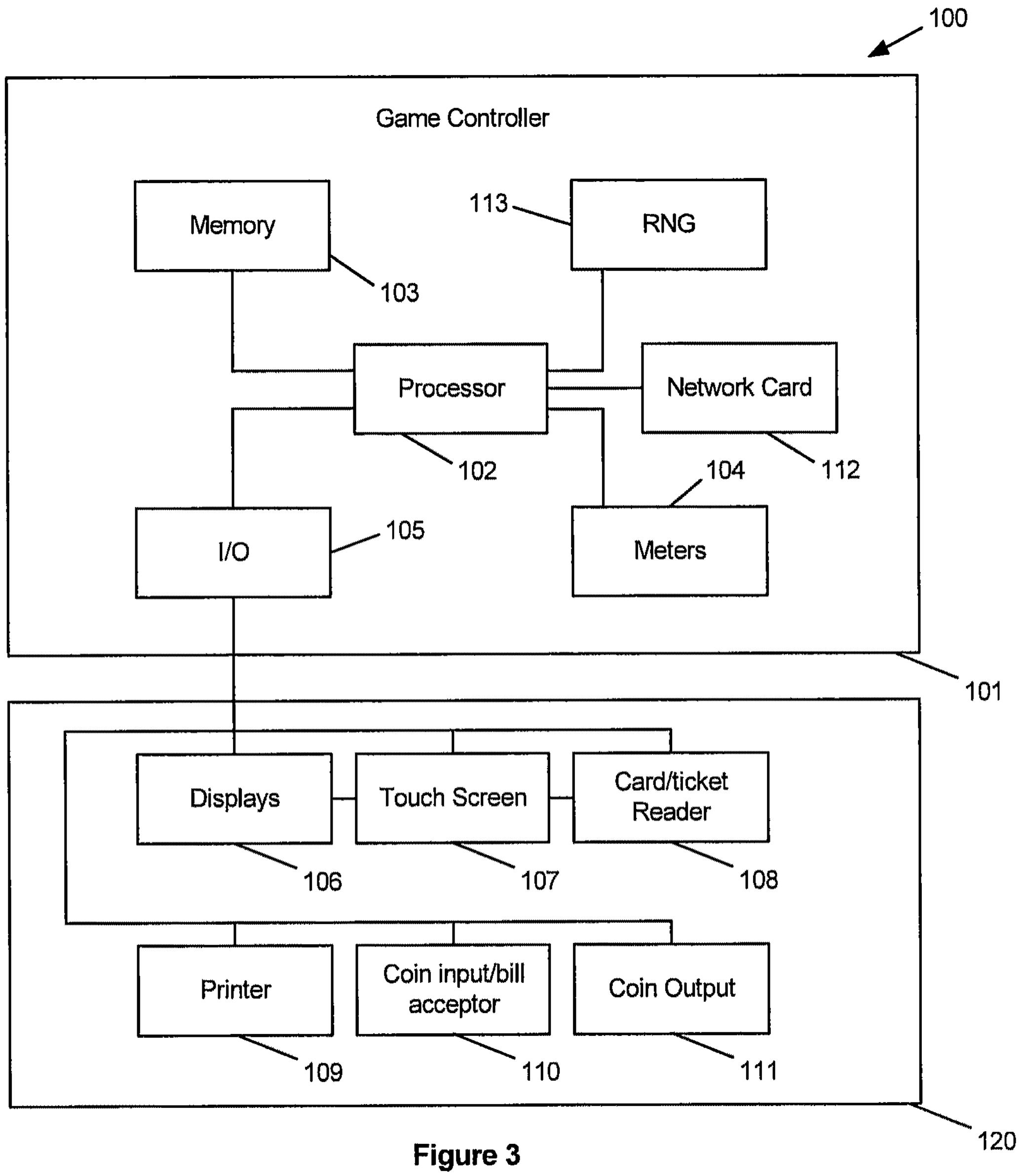
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 has one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
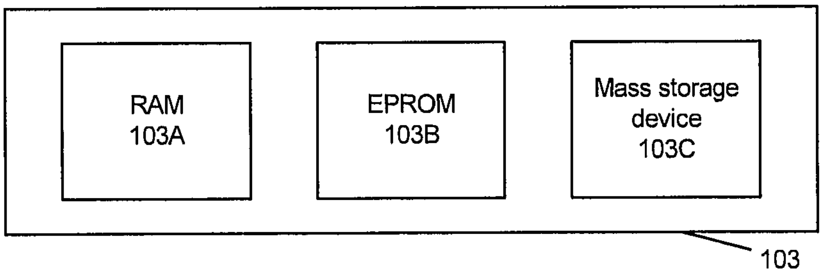
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
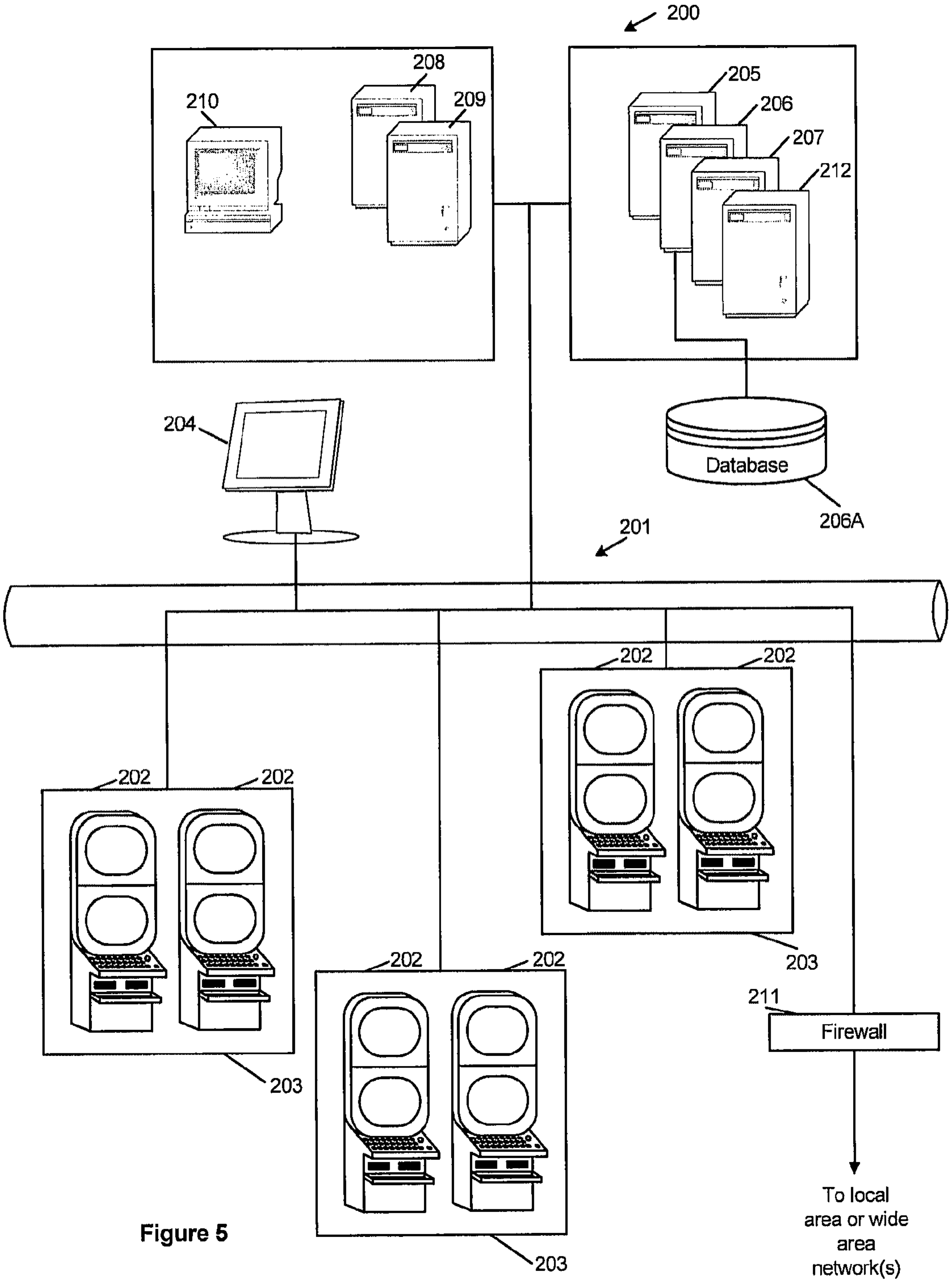
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting functions for a Jackpot game. A further server 212 may provide a loyalty program.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Figure 6:
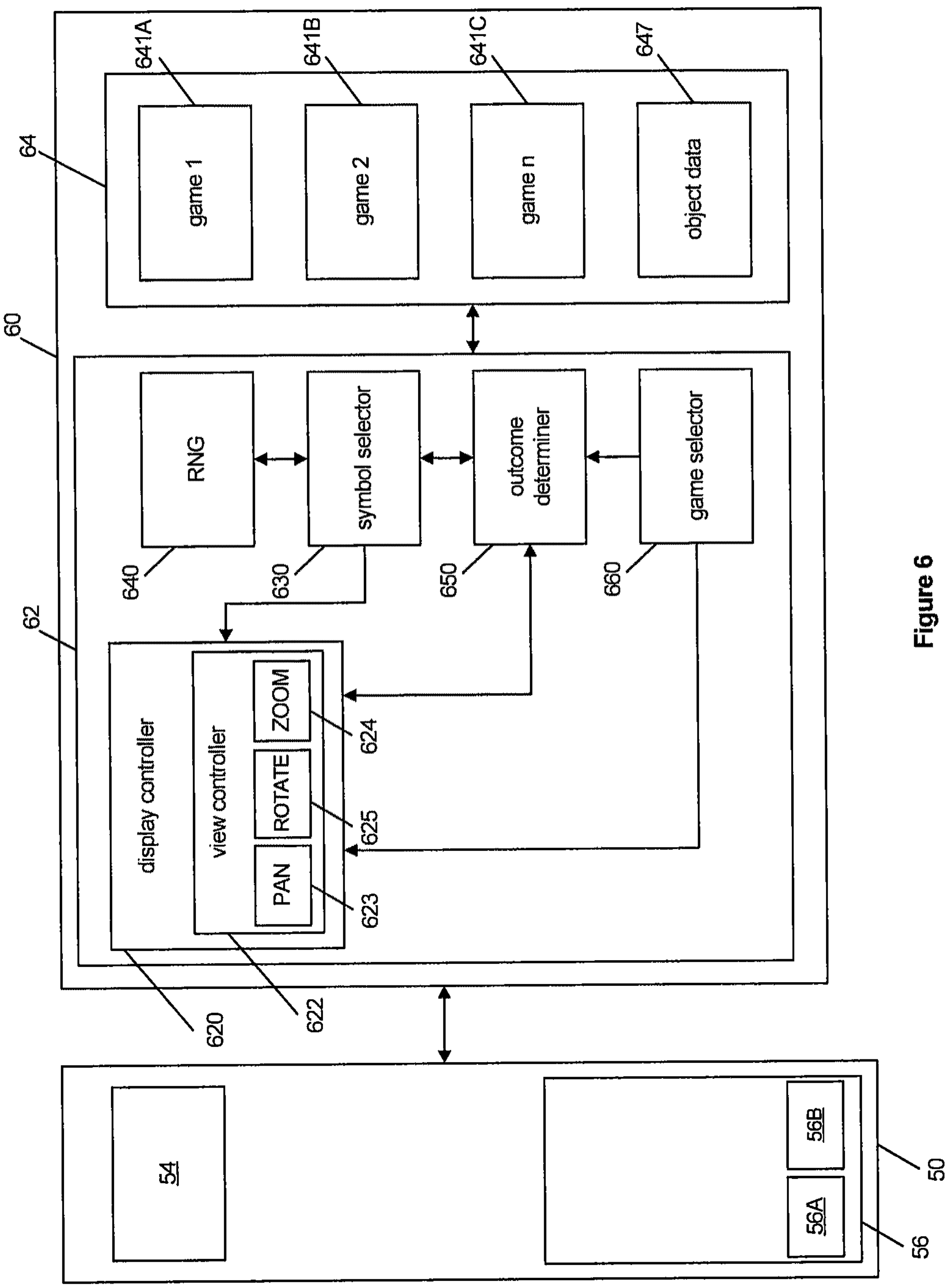
FIG. 6 is a functional block diagram of further components of the gaming system in particular showing detail of the game controller.
Figure 7:
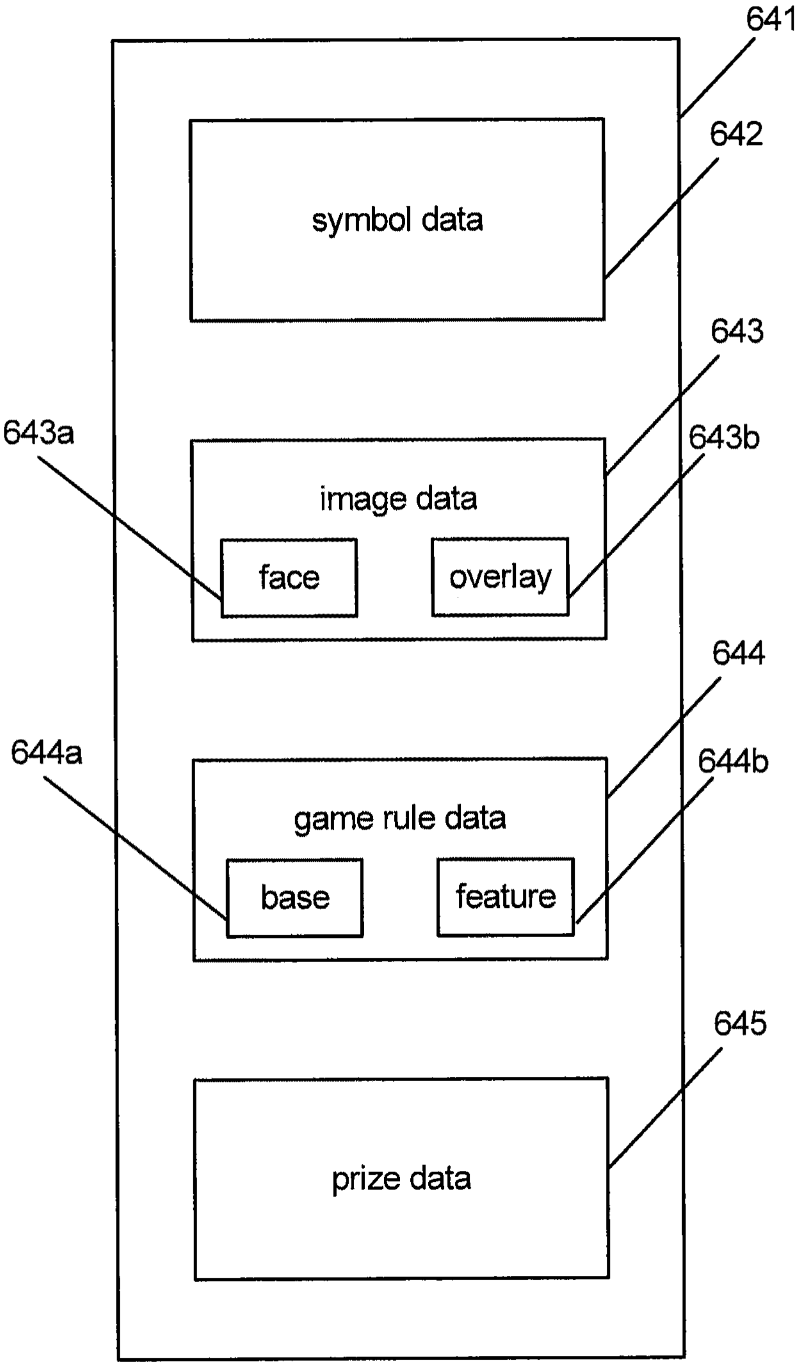
FIG. 7 shows detail of the data stored in respect of each game.
Figure 8:
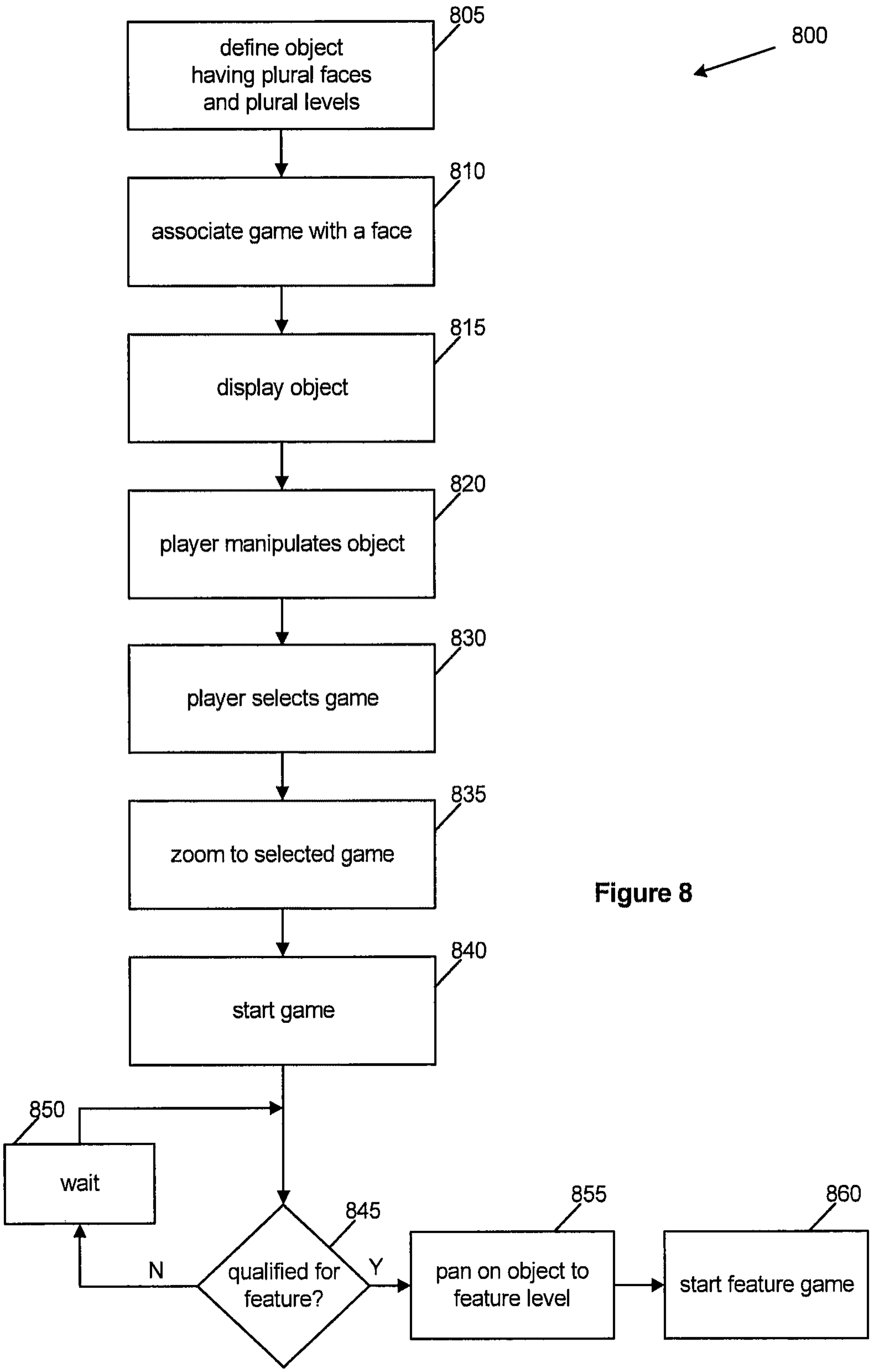
FIG. 8 is a flow chart of the method of the embodiment.

In the embodiment, the gaming system as illustrated in FIG. 6 is arranged so that a plurality of games can be displayed to a player for the player to make a selection of the game they wish to play. Accordingly, the game controller 60 incorporates a game selector 660 implemented by a processor 62. The game selector obtains object data 647 which defines the shape of the object to be displayed and the number of faces of the object. Persons skilled in the art will appreciate that the nature of the face will depend on the object and can be shown as smooth, rough or having a number of segments. The game selector also accesses the game data 641 for each game that is offered on the gaming machine which is stored in memory. The game data 641 of each game includes image data 643 including face data 643*a* to be displayed on the face of the object. The game selector 660 provides the face data to the display controller 620 to cause its display an object having at least two faces and on the display 54 of the player interface 50. The initial display can be performed in a number of different manners but is preferably arranged, where there are more than two faces, such that at least two faces are initially displayed to assist the player to understand that a three dimensional object is being displayed. If there are only two faces, one face will be displayed at a time. In some embodiments an object may have one or more "empty" faces which does not have a corresponding gene.

The player operates the instruction input mechanism 56 in order to control the display of the object. Specifically, the player is able to alter the view. Accordingly, the instruction mechanism 56 includes a view control portion 56*a*. The view control portion 56*a* is used by the player to access functions of the view controller 622 of the display controller. These functions include a pan function 623 a zoom function 624 and a rotate function 625.

Accordingly, depending on the embodiment, the player's access to the functions of the view controller 622 may be limited, for example to a rotate function 625 and the other functions may be carried out under control of the game selector 660. In such an embodiment, the player operates the view controls 56*a* to rotate the three dimensional object displayed on the display 54 to view the games that are on offer on the gaming machine. Once the player has selected a game the game selector 660 controls the zoom function of the view controller 622 to zoom in on the face corresponding to the selected game and to add to the display, game play data required for playing the game. For example, win line data, bet amount data and typically an initial set of symbols which may be the symbols of a set of reels, dice, balls, or the like.

The game selector 660 also passes to the outcome determiner the game that has been selected so that the outcome determiner 650 knows which game data 641*a*, 641*b* or 641*c* to access to carry out the game. The outcome determiner 650 then requests the symbol selector to select symbols for the symbol data 642 using the random number generator 640 in accordance with the game rule data 644 and displays the game results by passing data to the display controller 620 to enable it to control the display 54. Game outcomes are determined based on the game rule data 644 and prize data 645 in accordance with the normal techniques used in the art.

A person skilled in the art will appreciate that the image data 643 includes both the image to be displayed on the face of the objects during selection 643*a* and the overlay data 643*b* which is added to the display once the view controller has zoomed in on the relevant part of the object.

The embodiment is intended to be provided in relation to objects which have a number of levels and accordingly in addition to specifying the number of faces of the object and other characteristics of the object, the object data 647 also specifies how many levels are to be populated. In a typical embodiment the object will have two levels, a first level which is initially displayed and corresponds to a base game 644*a* and a second level which corresponds to a feature game 644*b*. When the outcome determiner 650 determines that the player has qualified for the feature game, the outcome determiner 650 controls the pan function 623 of view controller 625 to pan from a first level to a second level and zoom in on the second level in order to display image data 643 corresponding to the feature game 644. The outcome determiner 650 then calculates a game outcome based on the feature rule 644*b*. Persons skilled in the art will appreciate that a player can qualify for (or "trigger") the feature game in a number of ways known in the art including based on a game outcome, a bet amount over time, or a number of games played.

Accordingly, one process for providing the player interface involves defining an object having plural faces and plural levels 805, associating a game with a face 810, displaying the object to the player, the player manipulating the object 820, the player selecting a game 830, the game zooming to the selected game rate 835, the game starting 840, the outcome determiner determining whether the player is qualified for a feature 845 and entering a wait state 850 until the player qualifies (the player may not qualify), and if the player has qualified panning relative to the object to the feature level 855 and starting 860 the feature game.

A person skilled in the art will appreciate that in some embodiments the player may engage in further control of the view of the object. For example, the player may wish to view the feature game associated with a base game prior to entering a game selection input 56*b*. In such embodiments, the view controls 56 allow the player to access the pan 623 and zoom 624 functions. The player can pan up the object and zoom into the feature game to view the feature game.

A person skilled in the art will appreciate that a number of different objects will be suitable to displaying the multiple games. For example, if there are two games an object such as coin having two faces can be used for the object. For three or four games a three-sided or four-sided pyramid is appropriate (typical pyramids having three or four faces and a base). A pyramid is particularly advantageous as its tapered nature gives a clear indication of rising to different levels but a tapered object such as a pyramid need not necessarily be employed. In the example of a pyramid, the base may not correspond to a game. Other objects such as cubes may be appropriate, for example such that each of the six faces of a cube corresponds to a game, all that is required is that number of parts of the surface of the object can provide a face.

A person skilled in the art will also appreciate that while the technique of combining both rotating an object and moving up or down an object when a player activates a feature game is advantageous, a three dimensional display of objects can be used without panning between levels and vice versa.

Further while typically, the second level will be placed above the first level as moving upwards is more typically associated with progression. However, in some games, for example, a devil or dungeon themed game it may be appropriate for the player to descend as the progress to the second phase.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Various other modifications and additions will be apparent to a person skilled in the art and should be considered as falling within the scope of the invention described herein. In particular, it will be appreciated that various features described herein can be combined to form further embodiments.

EXAMPLE

Figure 9:
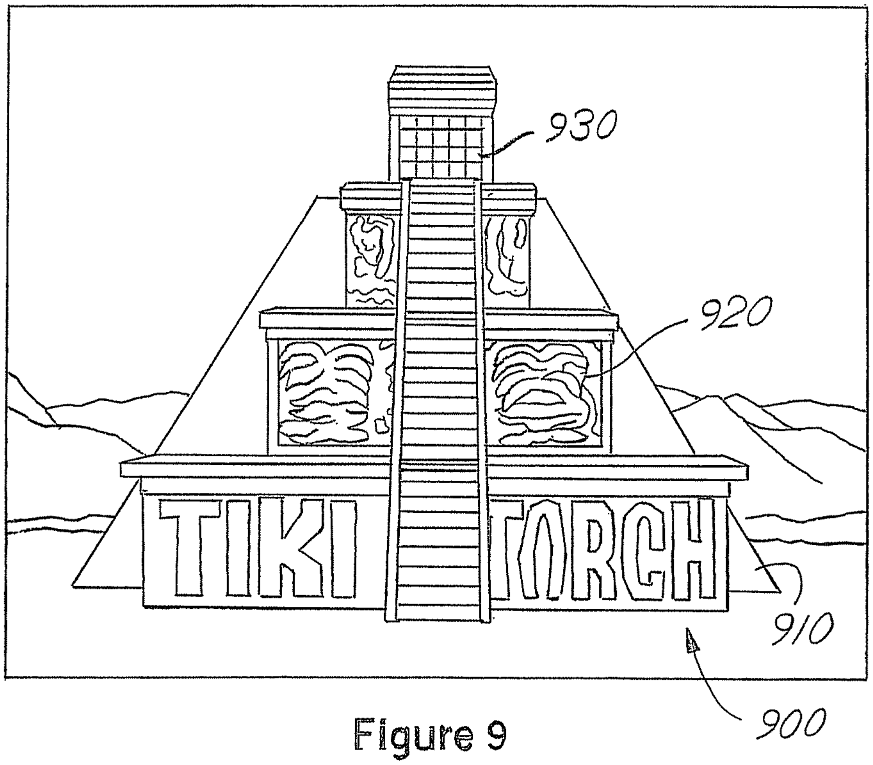
FIG. 9 is a first exemplary display.
Figure 10:
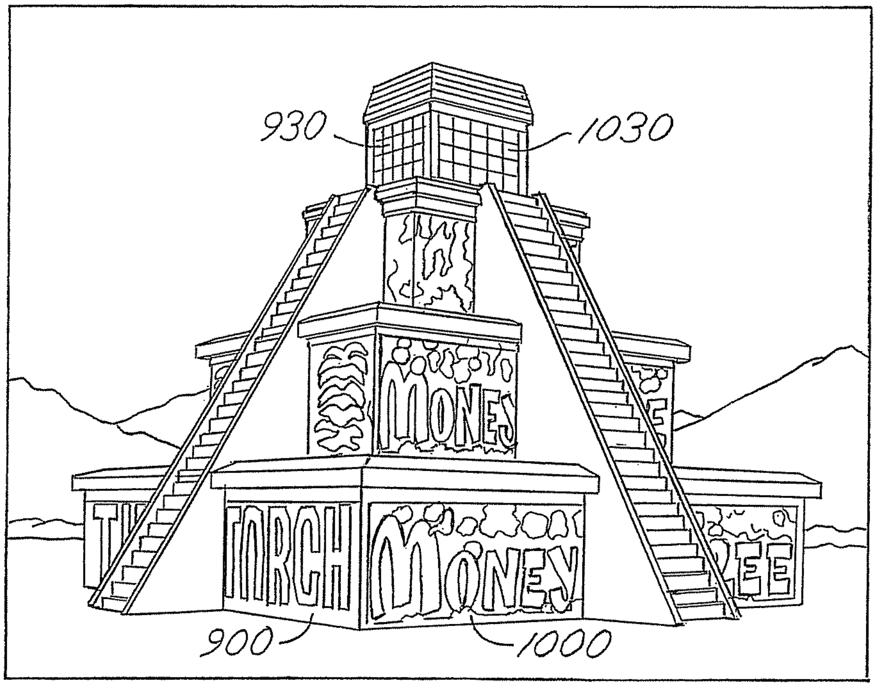
FIG. 10 is a second exemplary display.

The example illustrates the invention in relation to a 3D structure in the form of an Incan pyramid with four sides representing four different games, there being no game on the base. On all four sides there is a set of stairs on which dice roll down or appear once a game selected. Once the dice are in place a transparent bevel or overlay appears which includes game data and the dice start to roll. Once the feature is won, the camera can move up the stairs to the top of the pyramid where the feature is located. Referring to FIG. 9 there is shown a display of a pyramid where a first face 900 relates to the game "TIKI Torch" is viewable. The game is identified by a name 910 and graphics 920 that correspond to the game. The feature game for this game is viewable 930 at the top of the pyramid. Referring to FIG. 10, the pyramid has been partially rotated by a player so that a first face 900 corresponding to the game TICKI TORCH visible and a second game face 1000 corresponding to the game "Money Bee" is also visible. It can also be seen that the feature games 930, 1030 of both games are visible.

Figure 11:
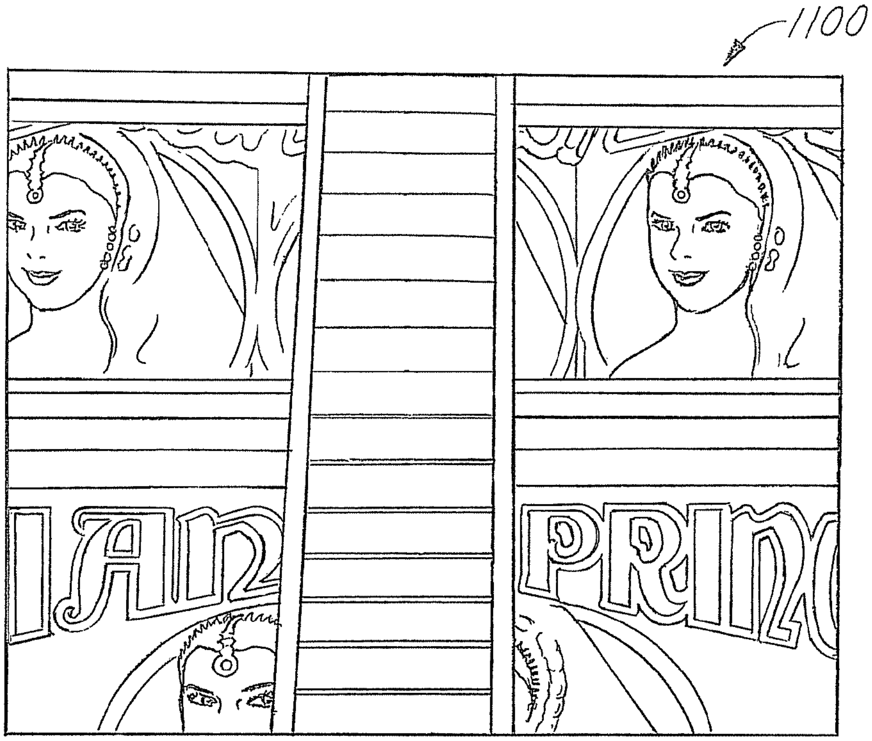
FIG. 11 is a third exemplary display.
Figure 12:
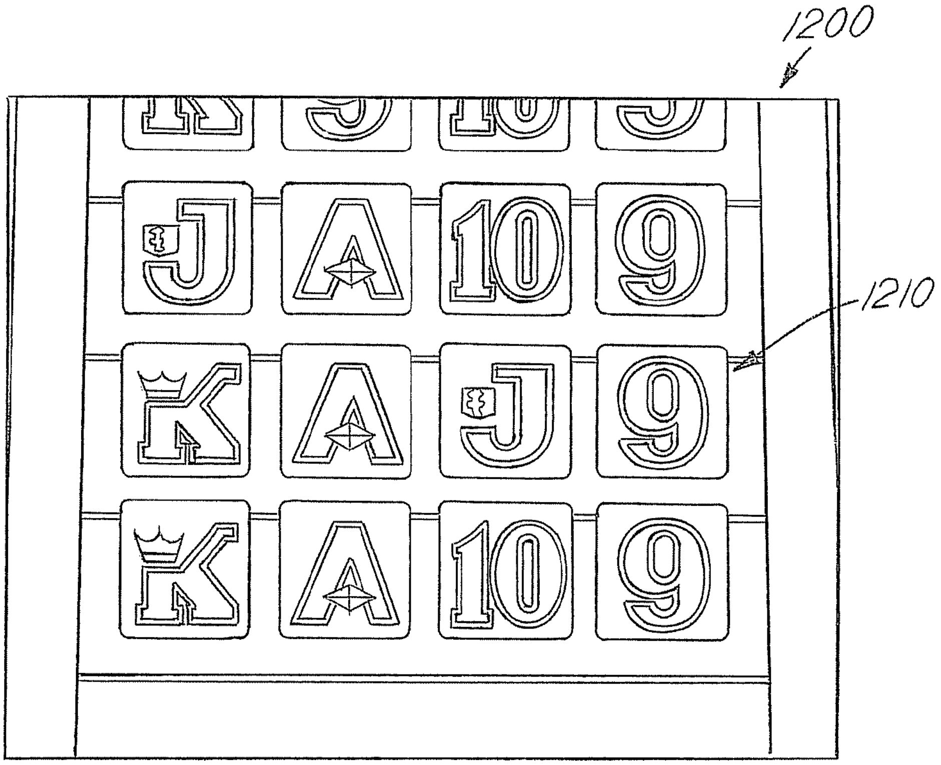
FIG. 12 is a fourth exemplary display.
Figure 13:
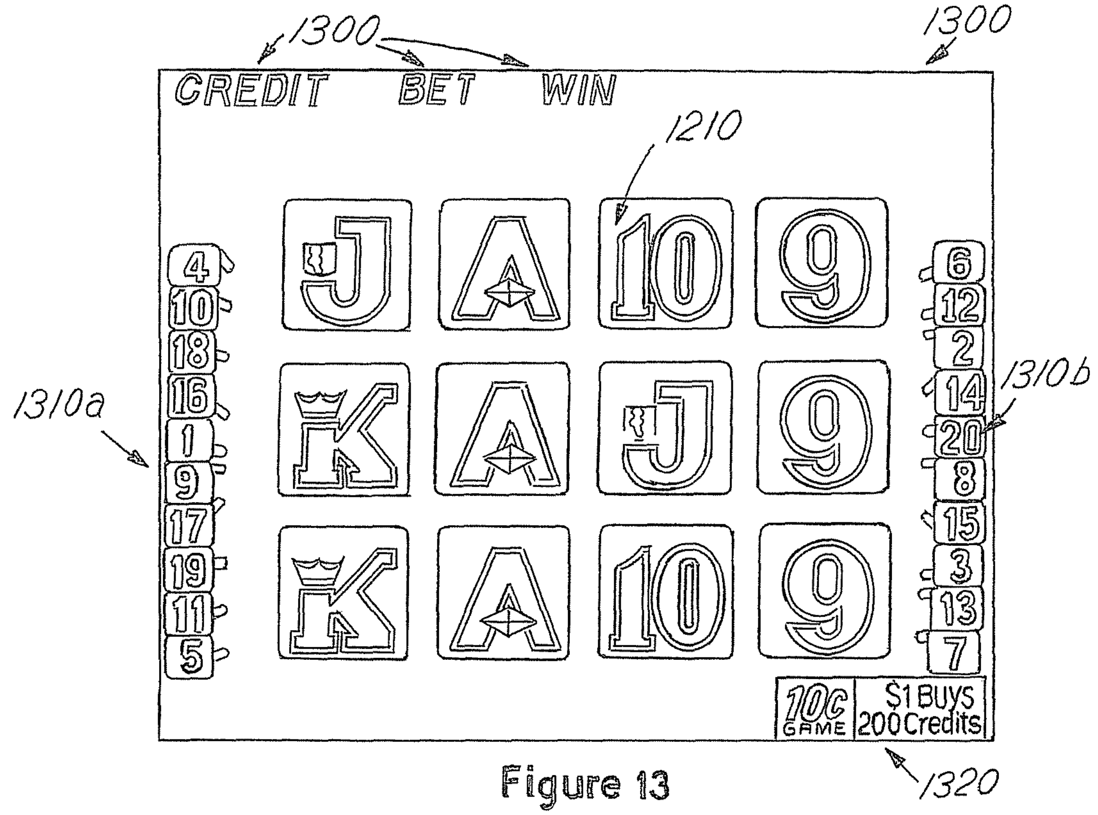
FIG. 13 is a fifth exemplary display.
Figure 14:
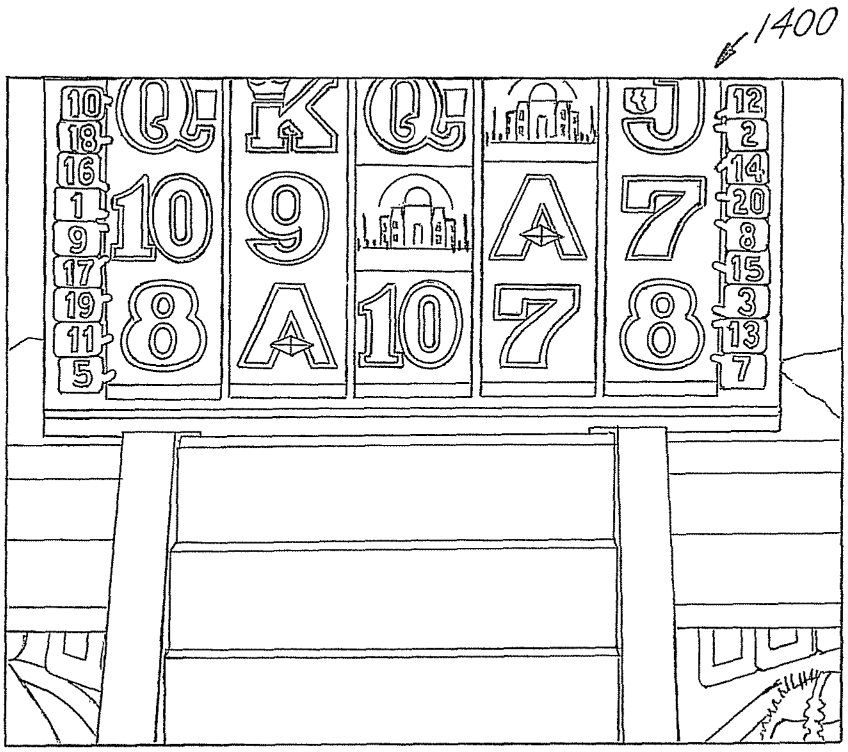
FIG. 14 is a sixth exemplary display.
Figure 15:
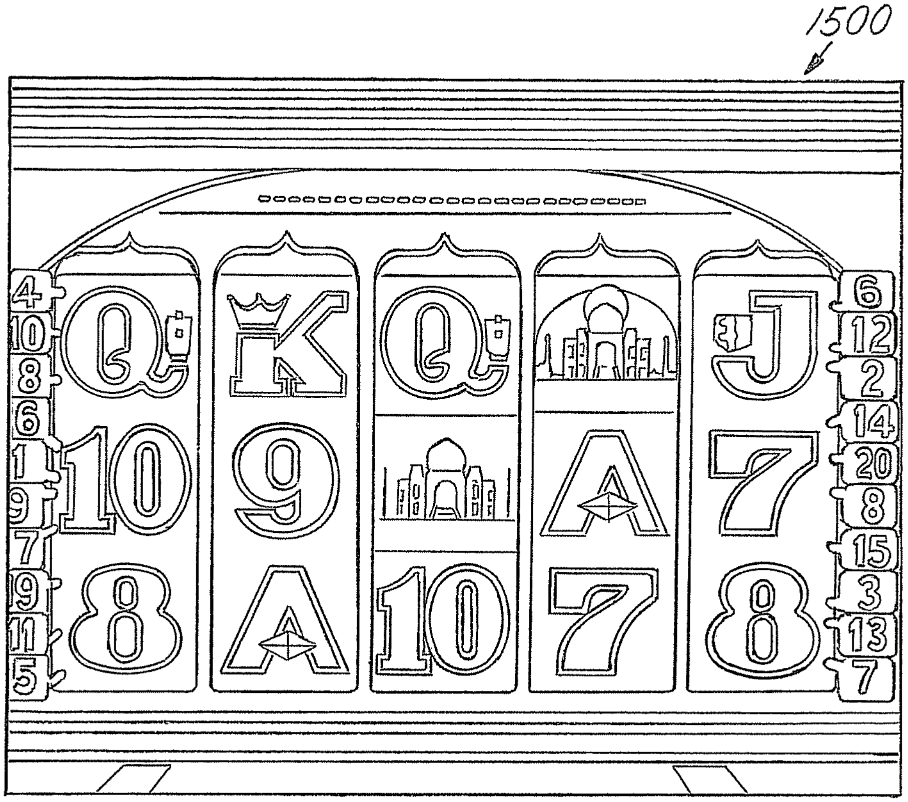
FIG. 15 is a seventh exemplary display.

Once the player chooses a game, the camera zooms in on the pyramid. In this embodiment on the second level. FIG. 11 shows a camera that is partially zoomed in. FIG. 12 shows that after the camera is completely zoomed in, a set of dice 1210 appear on the display. FIG. 13 shows that after the dice 1210 appear, game data including a transparent overlay 1300 having information about win lines 1310, information about credits for playing the game 1320, and a credit bet and win meter 1330 is added. If the player wins the feature or otherwise qualifies for the feature by techniques known in the art, the camera moves up the pyramid. A position half way up the pyramid is shown 1400 in FIG. 14. FIG. 15 shows that the feature screen 1500 is displayed at the top of the pyramid.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that the prior art forms a part of the common general knowledge in the art in any country.

The invention claimed is:

1. A method of providing a player interface for a gaming system comprising:

displaying an object to a player comprising at least two faces, each face of the object associated with a base game and a respective feature game playable with the gaming system, wherein each face of the object has an image thereon corresponding to its base game and its respective feature game, the object being initially displayed such that at least one face is visible to the player prior to game play, wherein each base game and respective feature game are games of chance;

providing to the player with a first view manipulator to allow the player to manipulate viewing of the object and thereby to select one of the at least two faces of the object for viewing;

providing to the player a second view manipulator to allow the player to manipulate viewing of the object once a face is selected for viewing using the first manipulator, the second view manipulator allowing the player to selectively pan and zoom into a respective feature game associated with the face selected for viewing so as to allow the player to view the respective feature game associated with the face selected for viewing prior to selection of any base game to play;

selecting a face of the object to play only the selected face's corresponding base game and the selected face's respective feature game;

upon selection by the player of the selected face's corresponding base game, via a computer processor, zooming into at least a portion of the selected face of the object corresponding to the selected face's corresponding base game to play the selected face's corresponding base game; and upon occurrence of a trigger during play of the selected face's corresponding base game, zooming into at least a portion of the face of the object corresponding to the respective feature game of the selected face's corresponding base game to play the respective feature game.

2. A method as claimed in claim 1, wherein said displaying the object to the player comprises defining the object, associating each face of the object with a game and providing image data for each face.

3. A method as claimed in claim 1, and wherein the object has two faces.

4. A method as claimed in claim 1, and wherein the object has three faces.

5. A method as claimed in claim 1, and wherein the object has four faces.

6. A method as claimed in claim 1, and wherein the first view manipulator provides a rotation function to rotate the object.

7. A method as claimed in claim 1, further comprising overlaying game play data on the zoomed selected face of the object corresponding to the selected face's corresponding base game.

8. A player interface for a gaming system comprising:

a display for displaying an object comprising at least two faces to a player such that at least one face is initially visible, each face of the object associated with a base game and a respective feature game and having an image thereon corresponding to its base game and its respective feature game;

a first view manipulator operable by the player to allow the player to manipulate viewing of the object and thereby to select one of the at least two faces of the object for viewing;

a second view manipulator to allow the player to manipulate viewing of the object once a face is selected for viewing using the first view manipulator, the second view manipulator allowing the player to selectively pan and zoom into a respective feature game associated with the face selected for viewing so as to allow the player to view the respective feature game associated with the face selected for viewing prior to selection of any base game to play;

selecting a face of the object to play only the selected face's corresponding base game and respective feature game, wherein, upon selection of the selected face's corresponding base game by the player, the display zooms in on at least one portion of the image corresponding to the selected face's corresponding base game to play the selected face's corresponding base game; and wherein, upon occurrence of a trigger during play of the selected face's base game, the display zooms in on at least one portion of the image corresponding to the respective feature game to play the respective feature game; and wherein each base game and respective feature game are games of chance.

9. A player interface as claimed in claim 8, wherein the first view manipulator is operable to rotate the object.

10. A player interface as claimed in claim 8, wherein the first view manipulator is operable to alter a point of view of the display relative to the object.

11. A gaming system comprising:

a display; and a game controller arranged to:

control the display to display to a player an object having at least two faces, wherein each face includes an image corresponding to a base game and a respective feature game;

provide the player with a first view manipulator to allow the player to manipulate viewing of the object and thereby to select one of the at least two faces of the object for viewing;

provide the player with a second view manipulator to allow the player to manipulate viewing of the object once a face is selected for viewing using the first view manipulator, the second view manipulator allowing the player to selectively pan and zoom into a respective feature game associated with the face selected for viewing so as to allow the player to view the respective feature game associated with the face selected for viewing prior to selection of any base game to play;

selecting a face of the object to play only the selected face's corresponding base game and respective feature game;

determine that a trigger event has occurred during play of the selected face's corresponding base game to enable the player to proceed to the selected face's corresponding respective feature game;

control the display to display a movement from a portion of the face corresponding to the selected face's corresponding base game to a portion of the face corresponding to the selected face's corresponding respective feature game; and wherein each base game and respective feature game are games of chance.

12. A gaming system as claimed in claim 11, wherein the game controller controls the display to execute a pan function and a zoom function in response to the trigger event.

* * * * *

UNITED STATES PATENT AND TRADEMARK OFFICE

CERTIFICATE OF CORRECTION

PATENT NO. : 8,764,562 B2
APPLICATION NO. : 12/138272
DATED : July 1, 2014
INVENTOR(S) : Visser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this
Eighth Day of September, 2015

Michelle K. Lee
*Director of the United States Patent and Trademark Office*